(12) United States Patent
Thirunavukkarasu

(10) Patent No.: US 11,188,934 B2
(45) Date of Patent: Nov. 30, 2021

(54) DYNAMIC DEMAND TRANSFER ESTIMATION FOR ONLINE RETAILING USING MACHINE LEARNING

(71) Applicant: Tata Consultancy Services Limited, Mumbai (IN)

(72) Inventor: Jeisobers Thirunavukkarasu, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 16/818,090

(22) Filed: Mar. 13, 2020

(65) Prior Publication Data

US 2020/0410517 A1 Dec. 31, 2020

(30) Foreign Application Priority Data

Jun. 28, 2019 (IN) .............................. 201921025959

(51) Int. Cl.
  *G06Q 30/02* (2012.01)
  *G06N 20/00* (2019.01)
  *G06Q 30/06* (2012.01)

(52) U.S. Cl.
  CPC ......... *G06Q 30/0204* (2013.01); *G06N 20/00* (2019.01); *G06Q 30/0201* (2013.01); *G06Q 30/0223* (2013.01); *G06Q 30/0631* (2013.01)

(58) Field of Classification Search
  CPC ........... G06Q 30/0204; G06Q 30/0201; G06Q 30/0223; G06Q 30/0631; G06N 20/00
  USPC ...................................................... 705/7.31
  See application file for complete search history.

(56) References Cited

U.S. PATENT DOCUMENTS

| 8,412,656 | B1* | 4/2013 | Baboo ................ G06Q 30/0282 706/20 |
| 9,785,953 | B2 | 10/2017 | Desai et al. |
| 10,410,272 | B1* | 9/2019 | Johnson ............ G06Q 30/0631 |
| 2008/0154693 | A1 | 6/2008 | Bateni et al. |
| 2009/0271245 | A1 | 10/2009 | Joshi et al. |

(Continued)

OTHER PUBLICATIONS

Farias, V.F. et al. "Building Optimized and Hyperlocal Product Assortments: A Nonparametric Choice Approach," retrieved from https://devavrat.mit.edu/wp-content/uploads/2017/12/Building-Optimized-and-Hyperlocal-Product-Assortments-A-Nonparametric-Choice-Approach.pdf.

*Primary Examiner* — Romain Jeanty
(74) *Attorney, Agent, or Firm* — Finnegan, Henderson, Farabow, Garrett & Dunner, LLP

(57) ABSTRACT

During online shopping, customer buying decision varies based on conditions at the time of logging such as product availability, competitor price of the product, presence of promotion, delivery options such as number of days to deliver, availability of free delivery, and availability of pay on delivery and customer review ratings. Customer shifts from one product to other product based on the options available at real time and accordingly demand of a product is transferred to other product. The method and system disclosed provides dynamic demand transfer values that are specific to a customer for available options at the time of login and it provides the list of ideal products to be displayed at the time of customer login. The method utilizes a suitable data format to apply machine learning based approach for estimating DT, wherein training data for ML captures plurality of sales drivers affecting customer decision during online retailing.

5 Claims, 8 Drawing Sheets

(56) References Cited

U.S. PATENT DOCUMENTS

| | | | | |
|---|---|---|---|---|
| 2010/0063869 A1* | 3/2010 | Kriss | G06Q 30/0201 | 705/7.29 |
| 2013/0018700 A1* | 1/2013 | Ervolina | G06Q 10/06 | 705/7.31 |
| 2014/0200992 A1* | 7/2014 | Wang | G06Q 30/0246 | 705/14.45 |
| 2014/0278795 A1* | 9/2014 | Satyamoorthy | G06Q 30/0201 | 705/7.33 |
| 2014/0324532 A1* | 10/2014 | Ghosh | G06Q 30/0202 | 705/7.31 |
| 2014/0358633 A1* | 12/2014 | Wu | G06Q 30/0202 | 705/7.31 |
| 2015/0127419 A1* | 5/2015 | Tiwari | G06F 16/24578 | 705/7.29 |
| 2017/0200172 A1* | 7/2017 | Wu | G06N 5/02 | |
| 2018/0315059 A1* | 11/2018 | Venkatesh | G06Q 10/06375 | |
| 2019/0180301 A1* | 6/2019 | Mahalanobish | H04W 4/35 | |

\* cited by examiner

| Entity ID | Transaction Time | Customer ID | YY/MM /DD/ HH. | Customer Age (SD1) | Customer Income (SD2) | Customer Ethnicity (SD3) | Customer Profile_m | Sales drivers (SD1-SD5) for product category (P1-mobilephone) | | | | | | | | | | | | | |
|---|---|---|---|---|---|---|---|---|---|---|---|---|---|---|---|---|---|---|---|---|---|
| | | | | | | | | Inventory availability (SD4) (available=1, unavailable =0) Products (P1-P_n) | | Competition Indicator (SD4) (Positive=1, Neutral =0, Negative =-1) Products (P1-P_n) | | Promotion Indicator (SD4) (Presence=1, Absence = 0) Products (P1-P_n) | | Days to Delivery (SD4) Products (P1-P_n) | | Availability of option 'Pay on Delivery' (Yes =1, No =0) Products (P1-P_n) | | Availability of option 'Free Delivery' (Yes =1, No =0) Products (P1-P_n) | | Customer review rating Products (P1-P_n) | |
| | | | | | | | | P_1 | P_n | P_1 | P_n | P_1 | P_n | P_1 | P_n | P_1 | P_n | P_1 | P_n | P_1 | P_n |
| C_1 | | | | | | | | 1 | 1 | 1 | 1 | 1 | 1 | 2 | 7 | 1 | 1 | 1 | 1 | 3 | 2 |
| C_2 | | | | | | | | 0 | 0 | 0 | 0 | 0 | 0 | 0 | 1 | 0 | 0 | 0 | 0 | 0 | 1 |
| C_3 | | | | | | | | | | | | | | | | | | | | | |
| C_4 | | | | | | | | | | | | | | | | | | | | | |
| C_100 0000 | | | | | | | | | | | | | | | | | | | | | |

FIG. 3A

| Customer ID | Transaction Time | Recorded Product Sale (Sold =1, Unsold =0) Products (P1-P_n) | | |
|---|---|---|---|---|
| | | P_1 | | P_n |
| C_1 | | | | |
| C_2 | | | | |
| C_3 | | | | |
| C_4 | | | | |
| | | | | |
| | | | | |
| C_1000000 | | | | |

FIG. 3B

| Customer ID | Transaction Time | Customer Age | Customer Income | Customer Ethnicity | Customer Profile_m | Inventory availability (SD4) (available=1, unavailable=0) Products (P1-P_n) | | Competition Indicator (SD4) (Positive=1, Neutral=0, Negative=-1) Products (P1-P_n) | | Promotion Indicator (SD4) (Presence=1, Absence=0) Products (P1-P_n) | | Days to Delivery (SD4) Products (P1-P_n) | | Availability of option 'Pay on Delivery' (Yes=1, No=0) Products (P1-P_n) | | Availability of option 'Free Delivery' (Yes=1, No=0) Products (P1-P_n) | | Customer review rating Products (P1-P_n) | |
|---|---|---|---|---|---|---|---|---|---|---|---|---|---|---|---|---|---|---|---|
| | | | | | | P_1 | P_n | P_1 | P_n | P_1 | P_n | P_1 | P_n | P_1 | P_n | P_1 | P_n | P_1 | P_n |
| C_te st_1 | 3/20 20/0 19:1 1:30 | 28 | ... | Hispanic | 1 | 1 | 1 | 1 | 1 | 0 | 0 | 3 | 3 | 1 | 1 | 1 | 1 | 4 | 3 |
| C_te st_1 | 3/20 20/0 19:1 1:30 | 28 | ... | Hispanic | 1 | 1 | 1 | 1 | 1 | 0 | 0 | 3 | 3 | 1 | 0 | 1 | 1 | 4 | 3 |

FIG. 4A

| Customer ID | Transaction Time | Probability to be sold | | |
|---|---|---|---|---|
| | | P_1 | | P_n |
| C_test_1 | 20/03/2019..11.30 | 0.5 | | 0.26 |
| C_test_1 | 20/03/2019..11.30 | 0.2 | | 0.29 |

FIG. 4B

| Customer ID | Transaction Time | DT Values | | |
|---|---|---|---|---|
| | | P_1 | | P_n |
| C_test_1 | 20/03/2019..11.30 | -- | | 10% |

FIG. 4C

| CustTransactionID | CustomerTime | CustomerAge | CustomerIncome | CustomerEthnicity | Customer profile_m | Inventory availability (SD4) (available=1, unavailable=0) Products (P1-P_n) | | Competition Indicator (SD4) (Positive=1, Neutral=0, Negative=-1) Products (P1-P_n) | | Promotion Indicator (SD4) (Presence=1, Absence=0) Products (P1-P_n) | | Days to Delivery (SD4) {Products (P1-P_n)} | | Availability of option 'Pay on Delivery' (Yes=1, No=0) Products (P1-P_n) | | Availability of option 'Free Delivery' (Yes=1, No=0) Products (P1-P_n) | | Customer review rating Products (P1-P_n) | |
|---|---|---|---|---|---|---|---|---|---|---|---|---|---|---|---|---|---|---|---|
| | | | | | | P_1 | P_n | P_1 | P_n | P_1 | P_n | P_1 | P_n | P_1 | P_n | P_1 | P_n | P_1 | P_n |
| C_t est_1 | 20/03/20 19.11.30 | 28 | ...... | Hispanic | ...... | 1 | 1 | 1 | 1 | 0 | 0 | 3 | 3 | 1 | 1 | 1 | 1 | 4 | 3 |
| C_t est_1 | 20/03/20 19.11.30 | 28 | ...... | Hispanic | ...... | 1 | 1 | 1 | 1 | 0 | 0 | 3 | 3 | 1 | 0 | 1 | 1 | 4 | 3 |

FIG. 5A

| Customer ID | Transaction Time | Probability to be sold | | |
|---|---|---|---|---|
| | | P_1 | | P_n |
| C_test_1 | 20/03/2019..11.30 | 0.6 | | 0.26 |
| C_test_1 | 20/03/2019..11.30 | 0.3 | | 0.284 |

FIG. 5B

| Customer ID | Transaction Time | DT Values | | |
|---|---|---|---|---|
| | | P_1 | | P_n |
| C_test_1 | 20/03/2019..11.30 | -- | | 8% |

FIG. 5C

DYNAMIC DEMAND TRANSFER ESTIMATION FOR ONLINE RETAILING USING MACHINE LEARNING

PRIORITY CLAIM

The present application claims priority from Indian patent application no. 201921025959, filed on Jun. 28, 2019. The entire contents of the aforementioned application are incorporated herein by reference.

TECHNICAL FIELD

The disclosure herein generally relates to data analysis and insights, and, more particularly, to method and system for customer specific dynamic Demand Transfer (DT) estimation for online retailing by using machine learning.

BACKGROUND

Recent years have seen significant growth in online retailing due to advancement of digital technologies. In online retailing, commonly referred as online shopping, customer buying decision is a critical factor to be analyzed to predict and prioritize the possible next to buy list of a customer. To predict the possible next buy items to a customer and enhance his shopping experience, it is necessary to focus various aspects of sales drivers. Analysis of behavioral data and demographic data have been used in such predictions. More of the sales drivers are considered, better will be the prediction. Moreover, real time scenarios that exist during actual online shopping do have a significant effect on customer buying decisions. The customer shifts from one product to other product based on the options available at real time and accordingly demand of a product is transferred to other product. Thus, weightage of every sales driver can change dynamically based on the real time conditions such as stock availability of products and promotional factor at time of online transaction. Further, Demand Transfer (DT) is customer specific as dynamic decision making of a customer depends on availability of payment options and other sales drivers at the time of login and customer's decision on next to buy varies accordingly. These factors need to be considered to improve accuracy of dynamic Demand Transfer (DT) estimation of online retailing and to enable improved shopping experiences of online customers due to customized display of products in real time.

SUMMARY

Embodiments of the present disclosure present technological improvements as solutions to one or more of the above-mentioned technical problems recognized by the inventors in conventional systems.

For example, in one aspect, there is provided a processor implemented method for estimating a dynamic Demand Transfer (DT). The method comprises processing data associated with a plurality sales drivers associated with a plurality of products in a product category, wherein the processed data is associated with transactions of online retailing for the plurality of products, recorded for a customer set. The method further comprises generating a primary data matrix and a secondary data matrix from the processed data to provide a training data in the form of a multivariate multi-dependent structure for training a Machine Learning (ML) model. The primary data matrix provides a Customer identity (CID) of each customer from the customer set, transaction time recorded for multiple successful transactions during the online retailing of each customer in the sample customer set, a set of customer demographics, the plurality of sales drivers for each product from the plurality of products with the product category. The secondary data matrix comprises the CID of each customer from the sample customer set, the transaction time recorded for the multiple successful transactions of each customer, and recorded presence or absence of sales for each product from the product category at every instant of the transaction time recorded in the secondary data matrix. The method further comprises training the ML model using the primary data matrix and the secondary data matrix to learn patterns associated the transactions during the online retailing. Furthermore, the method comprises predicting, using the ML model, probability of sale of each product at real time under specific values of the plurality of sales drivers at the current instance engaged in the online retailing of the product category at a current instance. Furthermore, the method comprises estimating Demand transfer (DT) of each product to the remaining products from the product category for the current instance based on the probabilities of sale of each product at real time.

In another aspect, there is provided a system for estimating a dynamic Demand Transfer (DT). The system comprises a memory storing instructions; one or more Input/Output (I/O) interfaces; and a processor (104) coupled to the memory (102) via the one or more I/O interfaces (106), wherein the processed data associated with a plurality sales drivers associated with a plurality of products in a product category, wherein the processed data is associated with transactions of online retailing for the plurality of products, recorded for a customer set. The processor is further configured to generate a primary data matrix and a secondary data matrix from the processed data to provide a training data in the form of a multivariate multi-dependent structure for training a Machine Learning (ML) model. The primary data matrix provides a Customer identity (CID) of each customer from the customer set, transaction time recorded for multiple successful transactions during the online retailing of each customer in the sample customer set, a set of customer demographics, the plurality of sales drivers for each product from the plurality of products with the product category. The secondary data matrix comprises the CID of each customer from the sample customer set, the transaction time recorded for the multiple successful transactions of each customer, and recorded presence or absence of sales for each product from the product category at every instant of the transaction time recorded in the secondary data matrix. The processor is further configured to train the ML model using the primary data matrix and the secondary data matrix to learn patterns associated the transactions during the online retailing. Furthermore, the processor is further configured to predict, using the ML model, probability of sale of each product at real time under specific values of the plurality of sales drivers at current instance for a customer engaged in the online retailing of the product category. Furthermore, the processor is configured to estimate Demand transfer (DT) of each product to the remaining products from the product category for the current instance based on the probabilities of sale of each product at real time.

In yet another aspect, there are provided one or more non-transitory machine readable information storage mediums comprising one or more instructions, which when executed by one or more hardware processors causes a method for estimating a dynamic Demand Transfer (DT).

The method comprises of processing data associated with a plurality sales drivers associated with a plurality of products in a product category, wherein the processed data is associated with transactions of online retailing for the plurality of products, recorded for a customer set. The method further comprises generating a primary data matrix and a secondary data matrix from the processed data to provide a training data in the form of a multivariate multi-dependent structure for training a Machine Learning (ML) model. The primary data matrix provides a Customer identity (CID) of each customer from the customer set, transaction time recorded for multiple successful transactions during online retailing of each customer in the sample customer set, a set of customer demographics, the plurality of sales drivers for each product from the plurality of products with the product category. The secondary data matrix comprises the CID of each customer from the sample customer set, the transaction time recorded for the multiple successful transactions of each customer, and recorded presence or absence of sales for each product from the product category at every instant of the transaction time recorded in the secondary data matrix. The method further comprises training the ML model using the primary data matrix and the secondary data matrix to learn patterns associated the transactions during the online retailing. Furthermore, the method comprises predicting, using the ML model, probability of sale of each product at real time under specific values of the plurality of sales drivers at the current instance engaged in the online retailing of the product category. Furthermore, the method comprises estimating Demand transfer (DT) of each product to the remaining products from the product category for the current instance based on the probabilities of sale of each product at real time.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a component of this disclosure, illustrate exemplary embodiments and, together with the description, serve to explain the disclosed principles:

FIGS. 3A and 3B, FIGS. 4A through 4C and FIG. 5A through FIG. 5C are tables depicting data matrices used by system of FIG. 1 for ML based customer specific dynamic Demand Transfer (DT) estimation for online retailing, in accordance with an embodiment of the present disclosure.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide a method and system for Machine Learning (ML) based customer specific dynamic Demand Transfer (DT) estimation associated with transactions for a plurality of products in a product category in online retailing. Demand transfer estimation is done for a product as comparison with other products. Those products which are alternative to each other in terms of buying decisions form SKU groups. For example a customer may be interested to buy a mobile, then mobile category will from a SKU group. In certain cases, high end mobile models will form separate SKU group and low end mobile models will form a separate SKU group. It is assumed that within a SKU group all the products are alternative to each other in terms of buying to happen. A single SKU group and its related information are considered as input for demand transfer estimation, in light of the disclosed method.

Figure 1:
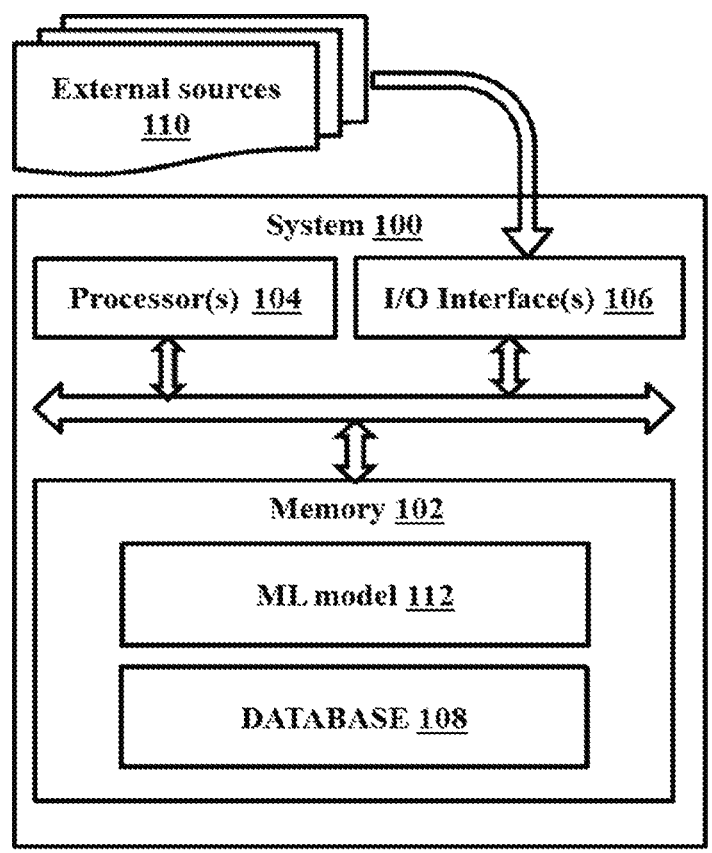
FIG. 1 illustrates an exemplary block diagram of a system for Machine Learning (ML) based customer specific dynamic Demand Transfer (DT) estimation for online retailing, in accordance with an embodiment of the present disclosure.

Referring now to the drawings, and more particularly to FIG. 1 and FIG. 5C, where similar reference characters denote corresponding features consistently throughout the figures, there are shown preferred embodiments and these embodiments are described in the context of the following exemplary system and/or method.

FIG. 1 illustrates an exemplary block diagram of a system 100 for automatically resolving ambiguities in regulations, in accordance with an embodiment of the present disclosure.

In an embodiment, the system 100 includes processor (s) 104, communication interface device(s), alternatively referred as or input/output (I/O) interface(s) 106, and one or more data storage devices or memory 102 operatively coupled to the processor (s) 104. The processor (s), alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports is configured to crawl external information from external sources 110. The external sources 110 may include data sources such as but not limited to online inventory management, online POS, online competitor information, online historical promotion, CRM, Historical online delivery options, customer review ratings providing information for a plurality of sales drivers for online retailing.

Information related to the plurality of sales drivers is utilized by the system 100 while generating a primary data matrix and a secondary data matrix, used as a training data set for training a Machine Learning (ML) model 112 for the AI based system 100. The multivariate multi-structure machine learning models are developed using random forest technique which is an ensemble learning method for regression. There are provision in open source softwares to consider multi-columns as dependent variable and independent matrix as causative factors. In one example, an open source software namely R software has package called Random Forest SRC. This package has provision to consider multivariate matrix as dependent variable and independent matrix as causative factors.

The trained ML model 112, for a customer engaged in the online retailing of the product category at a current instance: predicts probability of sale of each product at real time under specific values of the plurality of sales drivers at the current instance. Further, estimates Demand transfer (DT) of each product to the remaining products from the product category for the current instance.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment the memory 102, may store the ML model 112. Further, the memory 102 can include a database 108 that may store the training data set including the primary data matrix and the secondary data matrix used for training the ML model 112. Furthermore, the memory 102 can store the products in a queue, which is arranged in a descending order of the DT. A priority sequence of products from the product category to be displayed to the customer is based on the DT of the products and the specific values of the plurality of sales drivers during online retailing performed by a customer.

In an embodiment, the data base 108 may be external (not shown) to the system 100 and accessed through the I/O interfaces 106. The memory 102 may further comprise information pertaining to input(s)/output(s) of each step performed by the processor 104 of the system 100 and methods of the present disclosure.

Figure 2:
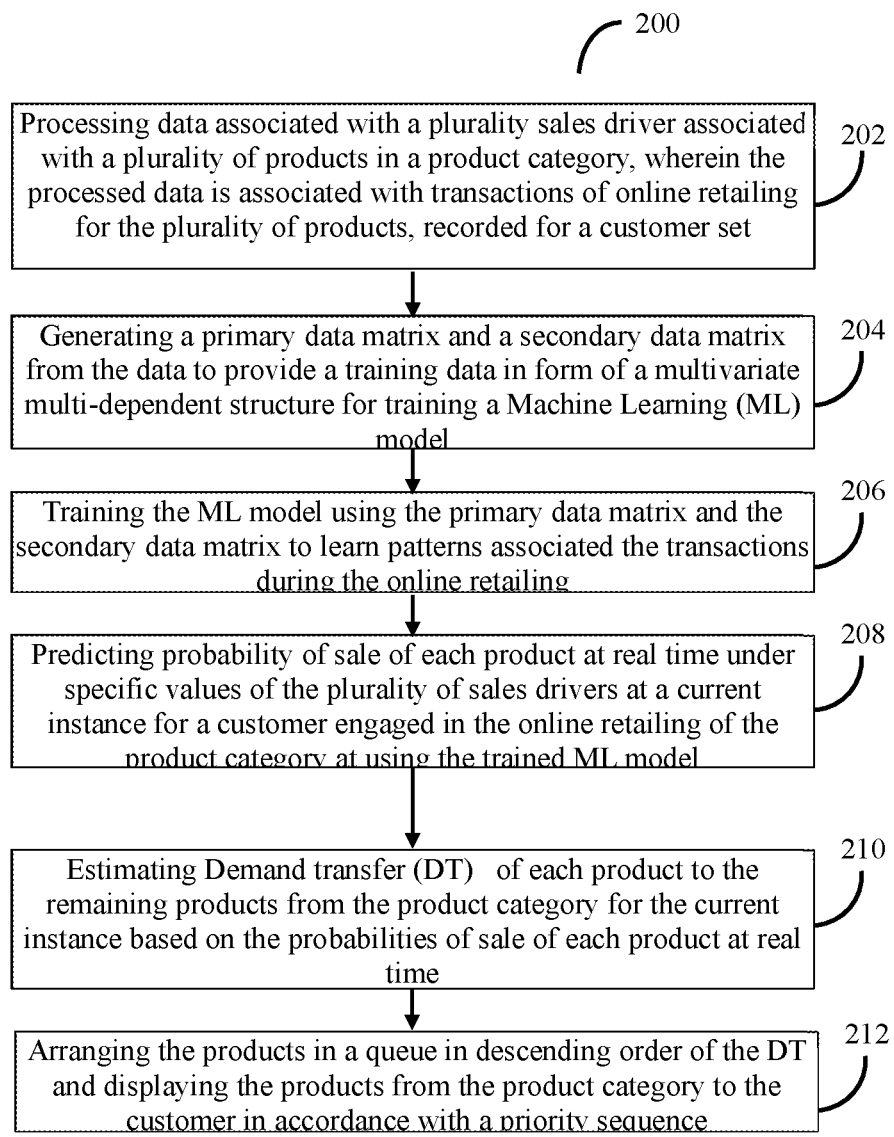
FIG. 2 illustrates an exemplary flow diagram of a method for ML based customer specific dynamic Demand Transfer (DT) estimation for online retailing using the system of FIG. 1, in accordance with an embodiment of the present disclosure.

FIG. 2 illustrates an exemplary flow diagram of a method 200 for ML based customer specific dynamic Demand Transfer (DT) estimation for online retailing using the system of FIG. 1, in accordance with an embodiment of the present disclosure. In an embodiment, the system 100 comprises one or more data storage devices or the memory 102 operatively coupled to the one or more processors 104 and is configured to store instructions for execution of steps of the method 200 by the one or more processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, in an embodiment of the present disclosure, at step 202, the processor (s) 104 is configured to process data associated with a plurality sales driver associated with the plurality of products in the product category. Further, the product category, for example, includes a mobile phone, while plurality of products may corresponds to different mobiles phones with different attributes such as brand, memory size, color and the like. The processed data is associated with transactions of online retailing for the plurality of products, recorded for a customer set. The plurality of sales drivers, for example, include information related to inventory availability of each product, competition indicator, promotion indicator, days to deliver, availability of pay-on-delivery option, availability of free shipping and customer rating. Processing of the data is explained here with an example. Say, price of the one or more products of top few competitors (sales drivers) is received through crawling of competitor websites. Then, this crawled data is processed to assign a specific values. For example herein, if retailer price of a product is lowest as compared to competitors then it is noted as '1' and if retailer price is more than any of the competitors then it is noted as '−1'. The processed data, can be stored in the database 108 to be used later to generate the training data for the ML model.

Referring now to the step 204 of the method 200, in an embodiment of the present disclosure, the processor (s) 104 is configured to generate the primary data matrix and the secondary data matrix from the data to provide the training data in the form of a multivariate multi-dependent structure. The training data is used for training the Machine Learning (ML) model.

An example primary data matrix, depicted in FIG. 3A, is structured to capture product specific causative factors at each online transactions. Similarly, FIG. 3B depicts an example secondary data matrix, which is structured to capture product specific sales in the form of presence or absence of sales as an indicator variable. This structured set up ensures to estimate product specific probability. The primary data matrix has columns and rows. Each column has product specific causative factors such as customer demographics, online options that are available in real time i.e. at the time of logging. Few examples for online options are availability of pay-on-delivery option, availability of free shipping, availability of stock for each product, availability of promotion and the like. Each row has the information at individual transaction level of every customer. It facilitates to learn the customer buying decision which is dynamic and based on real time online options that are available at the time of login. If there are n products within SKU group and those products are alternative to each other in terms of customer buying decision. The products are noted as P_1, P_2, . . . P_n. Among the plurality of columns of the example primary data matrix, a first column corresponds to a Customer identity (CID) with CID values in the subsequent rows of the first column having values such as C_1, C_2 and the like that can be user login credentials of each customer from the sample customer set (C_1 through C_n). A second column corresponds to transaction time recorded for each transactions during the online retailing of each customer. The transaction time, for example, can include time providing year, month, date and hour (YY/MM/DD/HH) of the transaction. Further, succeeding column corresponds to a set of customer demographics such as customer age, customer income, customer ethnicity and customer profile noted for each customer from the sample customer set. Columns succeeding to customer demographic provide plurality of sales drivers for each product from the plurality of products within the product category. The plurality of sales drivers include online options that are available in real time. Example for online options are availability of pay-on-delivery option, availability of free shipping, availability of stock for each product, availability of promotion and the like. If there are n products within SKU group, those products are alternative to each other in terms of customer buying decision. The products are noted as P_1, P_2, . . . P_n. Each product will have different online options based on many factors such as vendor, product movement, etc. for example if product selling is very high for a particular product then it may go as out of stock. In another instance vendor may be limiting the options such 'no pay on delivery' and 'no free home delivery'. Similar kind of online options are recorded in the defined format specified in the primary matrix. Each option is noted by an indicator variable such as '1' or '0' across P_1 to P_n based on available and non-availability of corresponding option at the time of log in particularly '1' denotes the availability of option and '0' denotes unavailability of option. The set up facilitates to capture interaction effect that arise in the customer mindset at the time of ordering. For example in the table P represents mobile phone category with values for sales drivers noted for different products P_1 to P_n for each customer C_1 through C_n. Further, as depicted in FIG. 3B, the secondary data matrix provides product specific sales in the form of presence or absence of sales as an indicator variable. It corresponds to the CID of each customer from the customer set C_1 through C_n, the transaction time recorded for the multiple successful transactions of each customer (YY/MM/DD/HH).

Referring now to the step 206 of the method 200, in an embodiment of the present disclosure, the processor (s) 104 is configured to train the ML model 112 using the primary data matrix and the secondary data matrix to learn patterns associated the transactions during the online retailing. Both the primary data matrix and secondary data matrix is passed into the machine learning models. The machine learning models relate primary data matrix with secondary data matrix. In other words simultaneous consideration of online options at a time and other sales drivers are mapped with simultaneous consideration of presence or absence of sale of all products for the same time through machine learning models. This set up trains the sales behavior that exist in the passing information. The success of training depends on the period of data used for learning and ideally it needs to be as long as possible and it should capture all possible scenarios that exist in real retail scenarios. The model with learnt behavior is ready to be used to estimate the probability for different conditions. Once trained, the ML model 112 implemented by the processor, at step 208 of the method 200, predicts probability of sale of each product at real time under specific values of the plurality of sales drivers at a current instance for a customer engaged in the online retailing of the product category.

Following paragraph, with an example, explains about the approach on how the probability is estimated based on two scenarios. First scenario is used to explain the effect of 'payment on delivery' and second scenario is used to explain the effect of promotion under payment on delivery. FIG. 4A through FIG. 4C depicts first scenario and FIG. 5A through FIG. 5C depict a second scenario.

The FIG. 4A depicts about two conditions in two rows such as regular condition in first row and special condition in second row. The FIG. 4B depicts about the estimated probability of sales due to two conditions and FIG. 4C depicts about the calculated demand transfer values. An example table in FIG. 4A depicts first scenario of current state or current values of the plurality of sales drivers for a test customer (C_test_1) engaged in the online retailing of the product category at a current instance. First row indicates 'regular condition' i.e. products P_1 to P_n have similar values for almost all sales drivers. For example P_1 and P_n both are available at the time ordering, both have positive impact on competition, both have pay-on-delivery option and P_1 has a higher customer review rating of 4 as compared to P_n. Second row indicates 'special condition' i.e. all sales drivers remain same except 'payment on delivery' and 'payment on delivery' has the value as '0' for P_1 indicating that 'payment on delivery' is not available. When this scenario is passed into the trained model (ML model 112) it predicts the probability of sale for each product within SKU group as depicted in FIG. 4B. Thus, under regular condition, the predicted probability of sale for P_1 is 0.5 and for P_n which is 0.26. Similarly under special condition predicted probability of sale of P_1 is 0.2 and for P_n is 0.29. In this way probability is predicted under different conditions by passing required information under defined format through trained model. Usually all options that are positive will form the regular condition and if some of the option(s) is absent or negative then it will form the special condition. Regular condition is fixed or static for a group of products and respective probability is estimated at one time. However special condition is dynamic and it comes from the options at the time of login by customer and respective probability is estimated at every time of login.

Upon receiving the probabilities of sale of each product at real time, at step 210 of the method 200, the processor 104 is configured to estimate Demand transfer (DT) of each product to the remaining products from the product category for the current instance. Explained here is the demand transfer (DT) calculation from the predicted probabilities. The difference in predicted probability of sales of P_1 is equal to the difference between (i) predicted probability of sales of P_1 under regular condition and (ii) predicted probability of sales of P_1 under special condition i.e. 'no payment on delivery'. So it comes as 0.5-0.2=0.3 and it is the result of non-availability of 'payment on delivery'. The difference amount '0.3' is transferred to other products. For example some portion of '0.3' is transferred to P_n. It is noted from the difference in predicted sales of P_n i.e 0.29-0.26=0.03. The difference amount 0.03 is transferred from 0.3 of P_1. So the amount transferred from P_1 to P_n is (0.03/0.3)*100=10%. Thus the demand transfer value from product P_1 to Product P_n is 10% under absence of 'payment of delivery'.

Demand transfer value from Product_1 to Product_n=Difference in probability of sales for P_n due to change in conditions of P_1/Difference in probability of sales for P_1 under two conditions. The two conditions are (i) under regular condition and (ii) under special condition. One example for special condition is 'no payment on delivery' for P_1.

Similarly the second scenario is as depicted in FIG. 5A through FIG. 5C. As depicted in FIG. 5A in first row, P_1 has a promotion and P_n does not have promotion. Customer review rating of P_1 is higher, while all other sales driver remain same. Thus under regular condition the predicted probability of sale of P_1 is 0.6 as compared to P_n which has 0.26. However, in second scenario, despite of promotion and high customer rating, as soon as payment on delivery option becomes unavailable, the predicted probability of sale of P_1 drops as 0.3 and the difference i.e 0.6 0.3=0.3 passes to other products, as can be seen in FIG. 5B. Particularly 8% of 0.3 which comes as 0.024 passes to P_n. So, as depicted in FIG. 5C the demand transfer value from product_1 to Product_n is 8% under changing business conditions.

In this way the demand transfer value is calculated using the probability of sales that are estimated from the trained model.

Thus the method considers dynamically changing online delivery options, sales drivers and corresponding customer decision making in real time while estimating demand transfer value of products. The DT values are used to display of products that are specific to customer in real time. Thus, the method effectively enhances customer experience and increases sales by rightly predicting and displaying possible buy item.

Once the DT values for each product for each customer are obtained from the ML model, at step 212 of the method 200, the processor (104) is configured to arrange the products (P_1 to P_n) in a queue in descending order of the DT. Further, a priority sequence of products from the product category to be displayed to the customer is based on the DT of the products and the specific values of the set of sales drivers during online retailing performed by a customer. For example, as per first scenario, the demand transfer value from P_1 to P_n is 10%. The same procedure and calculation for P_1 is applied across all SKUs within SKU group and corresponding demand transfer value is calculated and sorted in descending order. Assuming that P_n has the top DT value and P_2 has lowest DT value that are transferred from P_1, then P_n will be displayed at the top and P_2 will be displayed at the bottom of the list.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for estimating a dynamic Demand Transfer (DT), the method comprising:
   processing, by the processor, data associated with a plurality sales drivers associated with a plurality of products in a product category, wherein the processed data is associated with transactions of online retailing for the plurality of products, recorded for a customer set;
   generating, by the processor, a primary data matrix and a secondary data matrix from the processed data to provide a training data in form of a multivariate multi-dependent structure for training a Machine Learning (ML) model, wherein the primary data matrix provides a customer identity (CID) of each customer from the customer set, transaction time recorded for multiple successful transactions during the online retailing of each customer in the customer set, a set of customer demographics, the plurality of sales drivers for each product from the plurality of products in the product category, wherein the primary data matrix comprises of columns and rows, wherein each column comprises product specific causative factors that are available in real time at the time of customer login, and wherein each row comprises information at individual transaction level of every customer in the recorded customer set; and the secondary data matrix comprises the CID of each customer from the customer set, the transaction time recorded for the multiple successful transactions of each customer, and recorded presence or absence of sales for each product in the product category at every instant of the transaction time;

training, by the processor, the ML model using the primary data matrix and the secondary data matrix to learn patterns associated with the transactions during the online retailing, by mapping the plurality of sales drivers for each product with the recorded presence or absence of sales for each product in the product category at every instant of the transaction time recorded;

predicting, by the trained ML model implemented by the processor, a probability of sale of each product in real time under specific values of the plurality of sales drivers at a current instance for a customer engaged in the online retailing of the product category;

estimating, by the processor, dynamic DT values of each product to the remaining products in the product category for the current instance based on the probabilities of sale of each product in real time;

arranging, by the processor, the plurality of products in a queue in descending order of the DT values; and displaying, by the processor, the plurality of products in the product category to the customer in a priority sequence determined in accordance with the dynamic DT values of the plurality of products and the specific values of the set of sales drivers during online retailing performed by the customer, such that customer experience is enhanced by rightly predicting and displaying possible buy product in the product category.

2. The method of claim 1, wherein the plurality of sales drivers comprises inventory availability of each product, competition indicator, promotion indicator, days to deliver, availability of pay-on-delivery option, availability of free shipping and customer rating.

3. A system for estimating a dynamic Demand Transfer (DT), the system comprising:
a memory storing instructions;
one or more Input/Output (I/O) interfaces; and
a processor coupled to the memory via the one or more I/O interfaces, wherein the processor (104) is configured by the instructions to:
process data associated with a plurality sales drivers associated with a plurality of products in a product category, wherein the processed data is associated with transactions of online retailing for the plurality of products, recorded for a customer set;
generate a primary data matrix and a secondary data matrix from the processed data to provide a training data in form of a multivariate multi-dependent structure for training a Machine Learning (ML) model, wherein the primary data matrix provides a customer identity (CID) of each customer from the customer set, transaction time recorded for multiple successful transactions during the online retailing of each customer in the customer set, a set of customer demographics, the plurality of sales drivers for each product in the plurality of products in the product category, wherein the primary data matrix comprises of columns and rows, wherein each column comprises product specific causative factors that are available in real time at the time of customer login, and wherein each row comprises information at individual transaction level of every customer in the recorded customer set; and the secondary data matrix comprises the CID of each customer from the customer set, the transaction time recorded for the multiple successful transactions of each customer, and recorded presence or absence of sales for each product in the product category at every instant of the transaction time;

train the ML model using the primary data matrix and the secondary data matrix to learn patterns associated with the transactions during the online retailing, by mapping the plurality of sales drivers for each product with the recorded presence or absence of sales for each product in the product category at every instant of the transaction time recorded;

predict, using the trained ML model, a probability of sale of each product in real time under specific values of the plurality of sales drivers at a current instance for a customer engaged in the online retailing of the product category;

estimate dynamic DT values of each product to the remaining products in the product category for the current instance based on the probabilities of sale of each product at real time in real time;

arrange the plurality of products in a queue in descending order of the DT values; and display the plurality of products in the product category to the customer in a priority sequence determined in accordance with the dynamic DT values of the plurality of products and the specific values of the set of sales drivers during online retailing performed by the customer, such that customer experience is enhanced by rightly predicting and displaying possible buy product in the product category.

4. The system of claim 3, wherein the plurality of sales drivers comprises inventory availability of each product, competition indicator, promotion indicator, days to deliver, availability of pay-on-delivery option, availability of free shipping and customer rating.

5. One or more non-transitory machine readable information storage mediums comprising one or more instructions, which when executed by one or more hardware processors causes:
processing data associated with a plurality sales drivers associated with a plurality of products in a product category, wherein the processed data is associated with transactions of online retailing for the plurality of products, recorded for a customer set;
generating a primary data matrix and a secondary data matrix from the processed data to provide a training data in form of a multivariate multi-dependent structure for training a Machine Learning (ML) model, wherein the primary data matrix provides a customer identity (CID) of each customer from the customer set, transaction time recorded for multiple successful transactions during the online retailing of each customer in the customer set, a set of customer demographics, the plurality of sales drivers for each product from the plurality of products in the product category, wherein the primary data matrix comprises of columns and rows, wherein each column comprises product specific causative factors that are available in real time at the time of customer login, and wherein each row comprises information at individual transaction level of every customer in the recorded customer set; and the secondary data matrix comprises the CID of each customer from the customer set, the transaction time recorded for the multiple successful transactions of each customer, and recorded presence or absence of sales for each product in the product category at every instant of the transaction time;

training the ML model using the primary data matrix and the secondary data matrix to learn patterns associated with the transactions during the online retailing, by mapping the plurality of sales drivers for each product with the recorded presence or absence of sales for each product in the product category at every instant of the transaction time recorded;

predicting by the trained ML model, a probability of sale of each product in real time under specific values of the plurality of sales drivers at a current instance for a customer engaged in the online retailing of the product category;

estimating dynamic DT values of each product to the remaining products from in the product category for the current instance based on the probabilities of sale of each product in real time;

arranging the plurality of products in a queue in descending order of the DT values; and displaying the plurality of products in the product category to the customer in a priority sequence determined in accordance with the dynamic DT values of the plurality of products and the specific values of the set of sales drivers during online retailing performed by the customer, such that customer experience is enhanced by rightly predicting and displaying possible buy product in the product category.

\* \* \* \* \*